Jan. 4, 1949.   R. S. CARROL   2,458,058
HOLDER FOR CHAIN SAW SHARPENERS
Filed Jan. 27, 1947
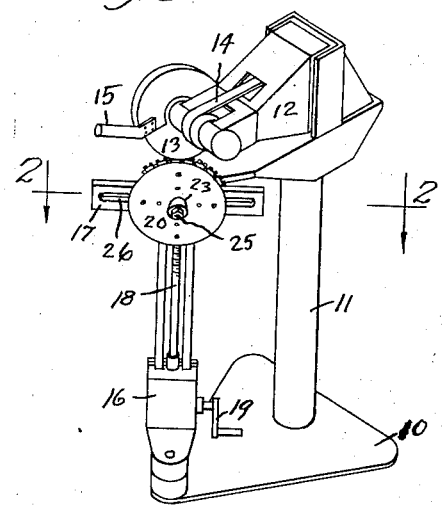
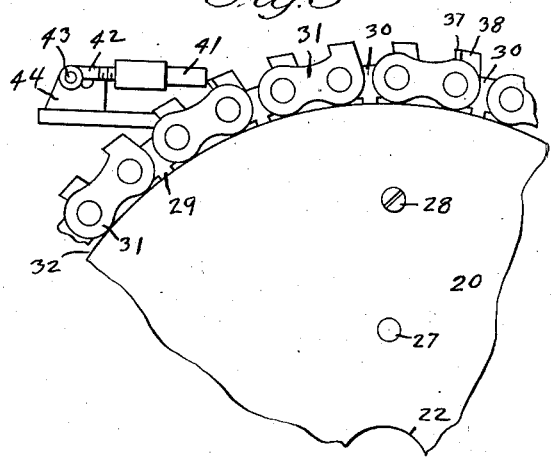
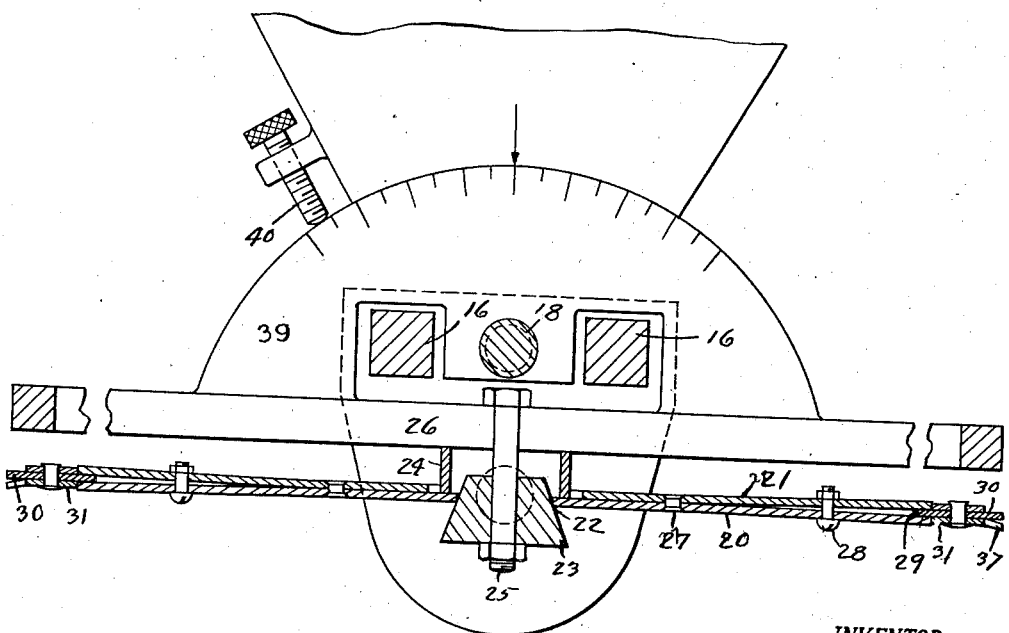
INVENTOR.
Raleigh S. Carroll
BY
ATTORNEY Patented Jan. 4, 1949

2,458,058

UNITED STATES PATENT OFFICE 2,458,058

HOLDER FOR CHAIN SAW SHARPENERS

Raleigh S. Carroll, Lebanon, Oreg.

Application January 27, 1947, Serial No. 724,652

1 Claim. (Cl. 76—37)

This invention relates generally to power saws of the chain type and particularly to a means for sharpening same on the conventional type of sharpener for circular saws.

The main object of this invention is to provide a holder by means of which the chain of a power saw may be securely and accurately held in position for grinding on the conventional form of hand saw sharpener designed for sharpening circular saws.

The second object is to provide a holder for saw chains which is easily mountable on the aforesaid sharpening machine without in any way altering the machine or detracting from its usefulness.

The third object is to construct a holder of the class described whereby precision grinding can be performed at a minimum expense.

I accomplish these and other objects in a manner set forth in the following specification as illustrated in the accompanying drawing, in which:

Fig. 1 is a perspective view of a common form of sharpener for circular saws, showing my device in position.

Fig. 2 is a fragmentary plan view taken along the line 2—2 in Fig. 1.

Fig. 3 is a fragmentary view of a saw chain and the stop.

Similar numbers of reference refer to similar parts throughout the several views.

Referring in detail to the drawing, there is shown in Fig. 1 a common form of sharpening machine for circular saws including a base 10 upon which is mounted a vertical standard 11 upon the upper end of which is disposed a grinder head 12 whose abrasive wheel 13 is driven by a belt 14 from a motor confined within the head 12. The head 12 is manually controlled by means of a handle 15. On the base 10 is also mounted a turret 16 having a slotted head 17 mounted thereon whose elevation is controlled by the screw 18 which is rotated by a crank 19 mounted on the turret 16. It will be understood that the turret 16 and the head 17 are revolvable on a verticle axis.

Such machines are now in common use and the specific details require no further explanation here.

Turning to Fig. 2, there will be seen a pair of disks 20 and 21, the former of which has a hole 22 formed therein to receive the tapered collar 23 which is spaced from the head 17 by the sleeve 24 and secured thereto by the bolt 25 which passes through the slot 26 in the head 17.

The disk 21 is secured to the disk 20 by the rivets 27 which are near the bolt 25 while bolts 28 pass through both of the disks 20 and 21 nearer the outer edge thereof. The purpose of this construction is to make it possible to use the disks 20 and 21 as a sprocket wheel between the sides of which may be held the lugs 29 of the block links 30 while the side links 31 ride on the outermost rims 32 of the disks 20 and 21.

In order to enable the operator to set his grinding wheel 13 at the desired angle with relation to the grinding faces 37 of the teeth 38, the head 12 is provided with a quadrant 39 provided with a clamping screw 40. The operation of the device is as follows. When it is desired to sharpen the chain of a power saw, it is merely placed around the disks 20 and 21 and sharpened in the same manner that an ordinary circular saw would be sharpened on the existing machine first described.

I have also provided an adjustable stop 41 which is supported by a screw 42 which is hinged on a pin 43 on the bracket 44.

While I have thus illustrated and described my invention, it is not my desire to be limited to the precise form shown herein, and I intend to cover such forms and modifications of the invention as fall fairly within the appended claim.

I claim:

A saw holding device, having in combination a sheave, consisting of a pair of dished disks having their outer rims spaced and having their central portions united and provided with a central opening, a tapering collar fitting into said opening, a head forming a support for said holder, a bolt passing through said collar and head, a sleeve between said head and disks surrounding the small end of said collar, a bolt forming the pivot for said collar and attaching same to said head, means for controlling the spacing of the rims of said disks and means for indexing the chain on the holder.

RALEIGH S. CARROLL.

REFERENCES CITED

The following references are of record in the file of this patent:

UNITED STATES PATENTS

| Number | Name | Date |
|---|---|---|
| 759,107 | Holland | May 3, 1904 |
| 813,910 | McClellan | Feb. 27, 1906 |
| 896,357 | Brown | Aug. 18, 1908 |
| 1,783,727 | Larsson | Dec. 2, 1930 |
| 1,944,184 | Kirchner | Jan. 23, 1934 |
| 2,213,413 | Shaw | Sept. 3, 1940 |
| 2,217,145 | Stihl | Oct. 8, 1940 |
| 2,318,456 | Blum | May 4, 1943 |
| 2,410,828 | Lofstrand | Nov. 12, 1946 |
| 2,413,919 | Huffsmith | Jan. 7, 1947 |
| 2,415,137 | Johnson | Feb. 4, 1947 |

FOREIGN PATENTS

| Number | Country | Date |
|---|---|---|
| 21,655 | Great Britain | Sept. 25, 1913 |